(12) United States Patent
Leung et al.

(10) Patent No.: US 10,542,001 B1
(45) Date of Patent: Jan. 21, 2020

(54) CONTENT ITEM INSTANCE ACCESS CONTROL

(71) Applicant: Amazon Technologies, Inc., Seattle, WA (US)

(72) Inventors: Hok Peng Leung, Redmond, WA (US); Bradley Heath, Irvine, CA (US)

(73) Assignee: Amazon Technologies, Inc., Seattle, WA (US)

(*) Notice: Subject to any disclaimer, the term of this patent is extended or adjusted under 35 U.S.C. 154(b) by 177 days.

(21) Appl. No.: 15/383,435

(22) Filed: Dec. 19, 2016

(51) Int. Cl.
 *H04L 29/06* (2006.01)
 *H04L 29/12* (2006.01)
 *H04L 29/08* (2006.01)

(52) U.S. Cl.
 CPC ...... *H04L 63/0876* (2013.01); *H04L 61/2007* (2013.01); *H04L 61/2517* (2013.01); *H04L 67/14* (2013.01); *H04L 63/1458* (2013.01); *H04L 67/42* (2013.01)

(58) Field of Classification Search
 CPC ............. H04L 63/0876; H04L 61/2517; H04L 61/2007; H04L 67/14; H04L 63/1458; H04L 67/42
 USPC ............................................. 726/4, 6, 26–29
 See application file for complete search history.

(56) References Cited

U.S. PATENT DOCUMENTS

| | | | | |
|---|---|---|---|---|
| 8,589,568 | B2* | 11/2013 | Arnold | H04L 12/14 705/40 |
| 8,892,600 | B2* | 11/2014 | Kenworthy | H04L 63/0209 707/783 |
| 8,910,300 | B2* | 12/2014 | Varsaysky Waisnnan-Diamond | H04L 29/12367 713/150 |
| 10,070,165 | B2* | 9/2018 | Dillon | G06F 21/10 |
| 10,285,025 | B1* | 5/2019 | Baker | G06Q 10/103 |
| 2005/0071481 | A1* | 3/2005 | Danieli | A63F 13/12 709/229 |
| 2013/0097315 | A1* | 4/2013 | Hao | H04N 21/2541 709/225 |

(Continued)

OTHER PUBLICATIONS

Waqas; "Electronic Arts, EA Servers Down? PoodleCorp claims it DDoSed Gaming Giant"; https://www.hackread.com/electronic-arts-ea-servers-poodlecorp-ddos/; HackRead; © 2011-2017; Aug. 31, 2016; accessed Feb. 2, 2018; 10 pages.

(Continued)

*Primary Examiner* — Jahangir Kabir
(74) *Attorney, Agent, or Firm* — BakerHostetler

(57) ABSTRACT

Techniques for content item instance access control are described herein. A computing service provider may host execution of a plurality of instances of an interactive content item, such as a video game. Each content item instance may be accessible to a respective set of one or more authorized clients that are associated with the respective content item instance and that are authorized to access the respective content item instance. Additionally, in one embodiment, each content item instance may be inaccessible to one or more unauthorized clients, such as clients that are not associated with the respective content item instance and that are not included in the set of authorized clients. By limiting access to a content item instance to authorized clients, the content item instance may be protected from malicious users, such as hackers, DoS and DDos attackers, and other malicious users.

17 Claims, 8 Drawing Sheets

(56) References Cited

U.S. PATENT DOCUMENTS

| | | | | |
|---|---|---|---|---|
| 2014/0283099 | A1* | 9/2014 | Smith | G06F 21/577 726/26 |
| 2015/0237527 | A1* | 8/2015 | Knutson | H04W 28/0289 726/4 |
| 2015/0302514 | A1* | 10/2015 | Trombetta | G06Q 30/0643 705/27.2 |
| 2015/0365402 | A1* | 12/2015 | Woo | H04L 63/0838 726/6 |
| 2017/0078324 | A1* | 3/2017 | Bordawekar | H04L 63/1458 |

OTHER PUBLICATIONS

Will Worley; "Pokeman Go Down: Hacking Group Claims Credit for Taking Down Servers 'With DDOS Attack'"; http://www.independent.co.uk/life-style/gadgets-and-tech/gaming/pokemon-go-down-servers-ddos-attack-hackers-poodlecorp-game-unavailable-a7140811.html; Independent; Jul. 2016; accessed Feb. 2, 2018; 34 pages.

Pete Haas; "PSN, Xbox Live Taken Offline by Hackers"; https://www.cinemablend.com/games/PSN-Xbox-Live-Taken-Offline-By-Hackers-69139.html; CinemaBlend; Dec. 2014; accessed Feb. 2, 2018; 11 pages.

Dennis Scimeca; "Gaming's frustrating history of DDos attacks"; https://www.dailydot.com/parsec/brief-history-ddos-attacks-gaming/; The Daily Dot; Aug. 25, 2014; accessed Feb. 3, 2018; 7 pages.

"Akamai's [state of the Internet]/security"; Q2 2016 Report; vol. 3 No. 2; Akamai Technologies, Inc.; © 2016; published Sep. 2016; 52 pages.

Sean Newman; Online Gaming Companies are EA-sy Targets for DDos Hackers'; https://www.corero.com/blog/757-online-gaming-companies-are-ea-sy-targets-for-ddos-hackers.html; Corero; Sep. 2016; accessed Feb. 2, 2018; 3 pages.

Kaspersky Lab; "Statistics on botnet-assisted DDos attacks in Q1 2015"; SecureList; https://securelist.com/statistics-on-botnet-assisted-ddos-attacks-in-q1-2015/70071/; May 2015; accessed Feb. 2, 2018; 9 pages.

Adam Holisky; "Blizzard and assorted network providers are under a DDos attack"; https://blizzardwatch.com/2016/09/18/blizzard-ddos/; Sep. 2016; accessed Feb. 7, 2018; 2 pages.

https://www.blizzard.com/en-us/; Blizzard Entertainment; © 2018; accessed Feb. 8, 2018; 4 pages.

* cited by examiner

CONTENT ITEM INSTANCE ACCESS CONTROL

BACKGROUND

Some computing service providers, such as operators of data centers and other large-scale computing services, may host execution of various content on behalf of one or more customers. For example, in some cases, a computing service provider may host execution of video games on behalf of one or more video game developers. In some examples, malicious users, such as hackers, may attempt to access hosted content and perform various malicious acts in relation to the hosted content. For example, denial of service (DoS) attacks and distributed DOS (DDoS) attacks are attempts to flood a server with large quantities of illegitimate or malicious requests until the server has no ability to respond to legitimate and non-malicious requests.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
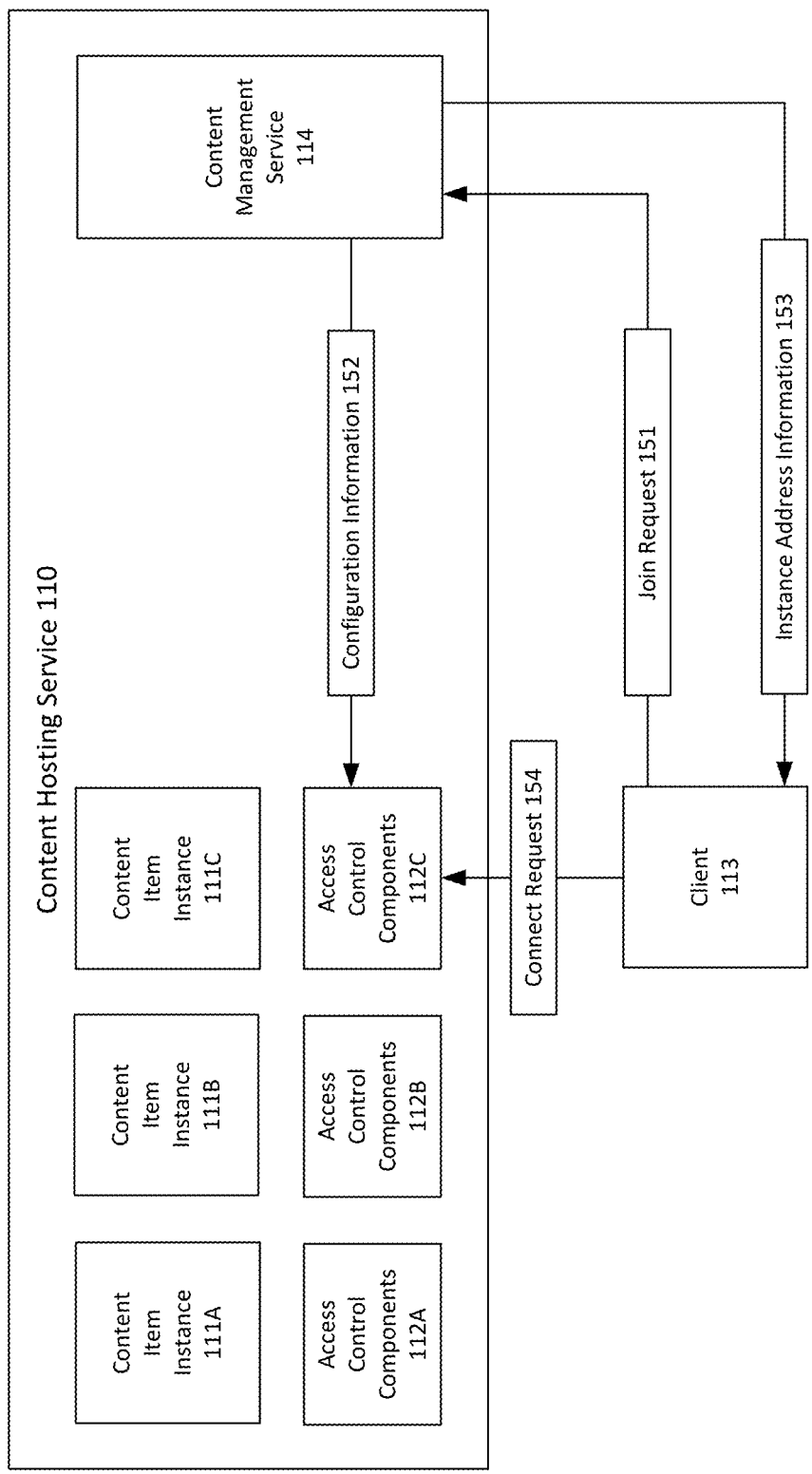
FIG. 1 is a diagram illustrating an example content item instance access control system that may be used in accordance with the present disclosure.

Techniques for content item instance access control are described herein. In one embodiment, a computing service provider may host execution of a plurality of instances of an interactive content item, such as a video game. One or more clients, such as one or more video game players, may connect to each content item instance in order to interact with the content item instance. In one embodiment, each content item instance may be accessible to a respective set of one or more authorized clients that are associated with the respective content item instance and that are authorized to access the respective content item instance. Additionally, in one embodiment, each content item instance may be inaccessible to one or more unauthorized clients, such as clients that are not associated with the respective content item instance and that are not included in the set of authorized clients. By limiting access to a content item instance to authorized clients, the content item instance may be protected from malicious users, such as hackers, DoS and DDos attackers, and other malicious users.

In one embodiment, when a first client wishes to join an interactive content item, the first client may send a first request, referred to hereinafter as a join request, to the content hosting service to join the interactive content item. In one embodiment, the join request may be associated with a first client Internet Protocol (IP) address, such as a client IP address from which the join request is sent or otherwise provided to the content hosting service. Upon receiving the join request, the content hosting service may determine a particular instance of the interactive content to which the first client is to be assigned or otherwise associated. In one embodiment, upon associating the first client with a particular content item instance, the content hosting service may provide address information to the first client for connecting to the particular content item instance. In one embodiment, the provided address information may include an IP address and a port number for the particular content item instance.

Additionally, upon associating the first client with the particular content item instance, the content hosting service may include the first client in the set of authorized clients associated with the particular content item instance. In one embodiment, the content hosting service may examine the join request from the first client to identify a particular client IP address associated with the join request, which, in this example, is the first client IP address. Upon identifying the first client IP address, the content hosting service may associate the first client IP address with the set of authorized clients associated with the particular content item instance. In one embodiment, one or more access control components associated with the particular content item instance may maintain a list of authorized IP addresses associated with the authorized clients for the particular content item instance. In one embodiment, the content hosting service may instruct the access control components to add the first client IP address to the list of authorized IP addresses for the particular content item instance.

In one embodiment, upon receiving the address information for the particular content item instance, the first client may issue a second request, referred to hereinafter as a connect request, to connect to the particular content item instance. In one embodiment, the connect request may be addressed to the particular content item instance using the address information for the particular content item instance provided to the first client by the content hosting service. Additionally, in one embodiment, similar to the join request, the connect request may also be associated with the first client Internet Protocol (IP) address, such as by being sent to the content hosting service from or otherwise provided through the first client IP address. For example, in some cases, the first client may issue the connect request from the same computer and/or IP address that was used to issue the join request. The connect request may be received by the content hosting service and, in turn, provided to the access control components for the particular content item instance to which the connect request is addressed.

Upon receiving the connect request, the access control components may examine the request to determine a particular client IP address associated with the connect request, such as a client IP address from which the connect request is sent or otherwise provided to the content hosting service. In one embodiment, the access control components may determine that the particular client IP address associated with the connect request is the first client IP address. Additionally, in one embodiment, upon determining that the first client IP address is associated with the connect request, the access control components may then examine the list of authorized IP addresses for the particular content item instance to determine whether the first client IP address associated with the connect request is included in the list of authorized IP addresses. In this example, the access control components had previously added the first client IP address to the list of authorized IP addresses in response to the join request from the first client. Thus, in this example, the first client IP address associated with the connect request will be included in the list of authorized IP addresses for the particular content item instance. In one embodiment, upon verifying that the first client IP address is an authorized IP address, the access control components may grant the first client access to the particular content item instance.

In one embodiment, a malicious connect request to join the particular content item instance may be issued by a malicious client that has not been assigned to or otherwise associated with the particular content item instance. In one embodiment, the access control components may receive and examine the malicious connect request to determine a particular client IP address associated with the malicious connect request, such as a client IP address from which the malicious connect request is sent or otherwise provided to the content hosting service. Additionally, the access control components may then examine the list of authorized IP addresses for the particular content item instance to determine whether the client IP address associated with the malicious connect request is included in the list of authorized IP addresses. In this example, because the malicious connect request is sent from a malicious client that is not assigned to or otherwise associated with the particular content item instance, the client IP address associated with the malicious connect request will not be included in the list of authorized IP addresses. In one embodiment, upon determining that the client IP address associated with the malicious connect request is not an authorized IP address, the access control components may deny the malicious client access to the particular content item instance, thereby protecting against malicious acts such as hacking, DoS and DDos attacks, and other malicious acts.

FIG. 1 is a diagram illustrating an example content item instance access control system that may be used in accordance with the present disclosure. In the embodiment of FIG. 1, a set of content item instances 111A-C is hosted by a content hosting service 110. In one embodiment, the content item instances 111A-C may be instances of an interactive content item, such as a video game. Additionally, in one embodiment, content hosting service 110 may host content item instances 111A-C on behalf of a customer, such as a video game developer. As should be appreciated, although three content item instances 111A-C are shown in FIG. 1, the disclosed techniques may be employed with respect to any number of content item instances. Additionally, in one embodiment, the quantity of content item instances 111A-C executing at any given time may be scaled up or down, such as based on changes in client demand for access to the content item.

In the embodiment of FIG. 1, content item instances 111A-C each have respective access control components 112A-C, which may generally control access to the respective content item instances. In particular, in one embodiment, access control components 112A-C may each maintain a list or other collection of information associated with clients that are authorized to access a respective content item instance 111A-C. As will be described in detail below, in one embodiment, an access control component 112A-C may grant access to respective a content item instance 111A-C to authorized clients, such as clients whose information is included in the list maintained by the access control component 112A-C. Additionally, in one embodiment, an access control component may also deny access to respective a content item instance 111A-C to unauthorized clients, such as clients whose information is not included in the list maintained by the access control component 112A-C. In one embodiment, access control components 112A-C may be wholly or partially integrated within respective content item instances 111A-C and/or within computing resources that execute that respective content item instances 111A-C, such as one or more virtual machine instances or other computing resources. Alternatively, in one embodiment, access control components 112A-C may be implemented using wholly or partially separate computing resources, such as separate hardware and/or software components.

In the embodiment of FIG. 1, client 113 has issued a join request 151 to content hosting service 110 to join a particular content item having content item instances 111A-C. Client 113 may be operated by a user, such as a video game player, that wishes to connect to and interact with the content item. The join request 151 is received by content management service 114, which, upon receiving the join request 151, may determine a particular content item instance 111A-C to which to assign or otherwise associate the client 113. In one embodiment, prior to and/or in combination with the join request, the client 113 may be required to provide identity verification information to the content hosting service 110, such as a username and password, or other information to indicate that the client 113 is operated by a user that is authorized to interact with the content hosting service 110, has an account with the content hosting service 110, and/or is not a malicious or suspicious user.

In one embodiment, the client 113 may be assigned to a particular content item instance 111A-C based, at least in part, on an available capacity of one or more content item instances 111A-C to accept new clients. Additionally, in one embodiment, content item instances 111A-C may communicate with content management service 114 and may provide information that may be used to determine their respective available capacity to accept new clients. In one embodiment, this information may include information relating to current quantities of assigned clients, clients that have recently joined or quit, current processor, memory or other resource usage information, and other information.

In the example of FIG. 1, content management service 114 has assigned client 113 to content item instance 111C. In one embodiment, content item instances 111A-C may each be executing at the time the join request 151 is received by content management service 114. Additionally, in one embodiment, content management service 114 may assign client 113 to content item instance 111C based on content item instance 111C having the most available remaining capacity to accommodate the new client 113. Alternatively, in one embodiment, content item instances 111A-B may be executing at the time the join request 151 is received by content management service 114, but content item instance 111C may not yet be launched. Additionally, in one embodiment, content management service 114 may determine that content item instances 111A-B are both currently full (i.e., unable to accept new clients) and may make a determination to launch content item instance 111C in order to accommodate client 113.

Additionally, upon receiving the join request 151, the content hosting service may examine the join request 151 to identify a particular client IP address associated with the join request 151. In one embodiment, the associated client IP address may be an IP address from and/or through which the join request 151 is sent, such as a public IP address associated with client 113. In one embodiment, the associated client IP address may be an address of or associated with a computer and/or communications device owned and/or operated by the client 113. Additionally, in one embodiment, the associated client IP address may be included in a header or other portion of the join request 151 and may be identified by examining the header or other portion of the join request 151. Upon identifying the client IP address associated with the join request 151, the content management service 114 may send configuration information 152 to access control components 112C for the content item instance 111C to which client 113 is assigned. In one embodiment, the configuration information 152 may identify the client IP address associated with the join request 151 and include instructions to authorize access to content item instance 111C for communications sent from the identified client IP address.

Figure 2:
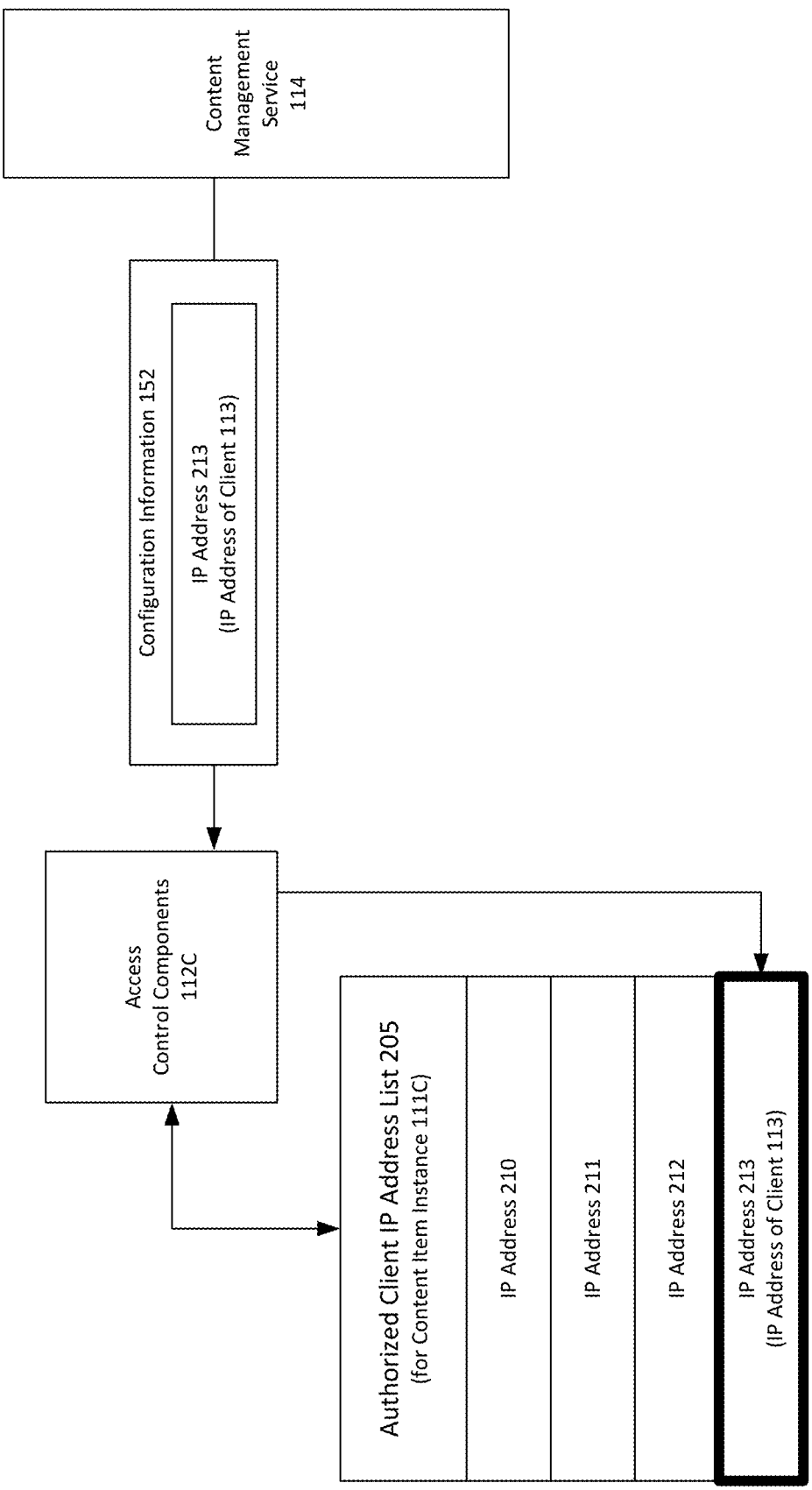
FIG. 2 is a diagram illustrating an example access control configuration that may be used in accordance with the present disclosure.

Referring now to FIG. 2, an example access control configuration for content item instance 111C will now be described in detail. In the embodiment of FIG. 2, access control components 112C maintain an authorized client IP address list 205, which includes a listing of IP addresses 210-212 of clients authorized to access the respective content item instance 111C to which components 112C control access. Additionally, in the embodiment of FIG. 2, upon assigning client 113 to content item instance 111C, content management service provides, to access control components 112C, configuration information 152 including IP address 213, which is the IP address of client 113 associated with the join request 151. Upon receiving configuration information 152, access control components 112C add the IP address 213 for client 113 to the authorized client IP address list 205 (as indicated in FIG. 2 by the thick and bold outline surrounding IP address 213 in list 205). As described in detail below, in one embodiment, upon adding IP address 213 to list 205, content item instance 111C may be made accessible to client 113 when subsequently requesting, via IP address 213, to connect to the content item instance 111C.

Referring back to FIG. 1, it is seen that, upon associating the client 113 with content item instance 111C, the content management service 114 may provide instance address information 153 to client 113 for connecting to the content item instance 111C. In one embodiment, the instance address information 153 may include an IP address and a port number for content item instance 111C. Upon receiving the instance address information 153, client 113 may issue a connect request 154 to connect to the content item instance 111C. In one embodiment, the connect request may be addressed to the content item instance 111C using the instance address information 153 provided to the client 113 by the content management service 114.

In one embodiment, the connect request 154 may be received by access control components 112C, which may be configured to intercept or otherwise monitor requests to connect to the respective content item instance 111C. Upon receiving the connect request 154, the access control components 112C may examine the connect request 154 to identify a particular client IP address associated with the connect request 154. In one embodiment, the associated client IP address may be an IP address from and/or through which the connect request 154 is sent, such as a public IP address associated with client 113. For example, in some cases, client 113 may send the connect request 154 from the same computer and/or IP address as was used to send the join request 151. In one embodiment, the associated client IP address may be included in a header or other portion of the connect request 154 and may be identified by examining the header or other portion of the connect request 154.

Figure 3:
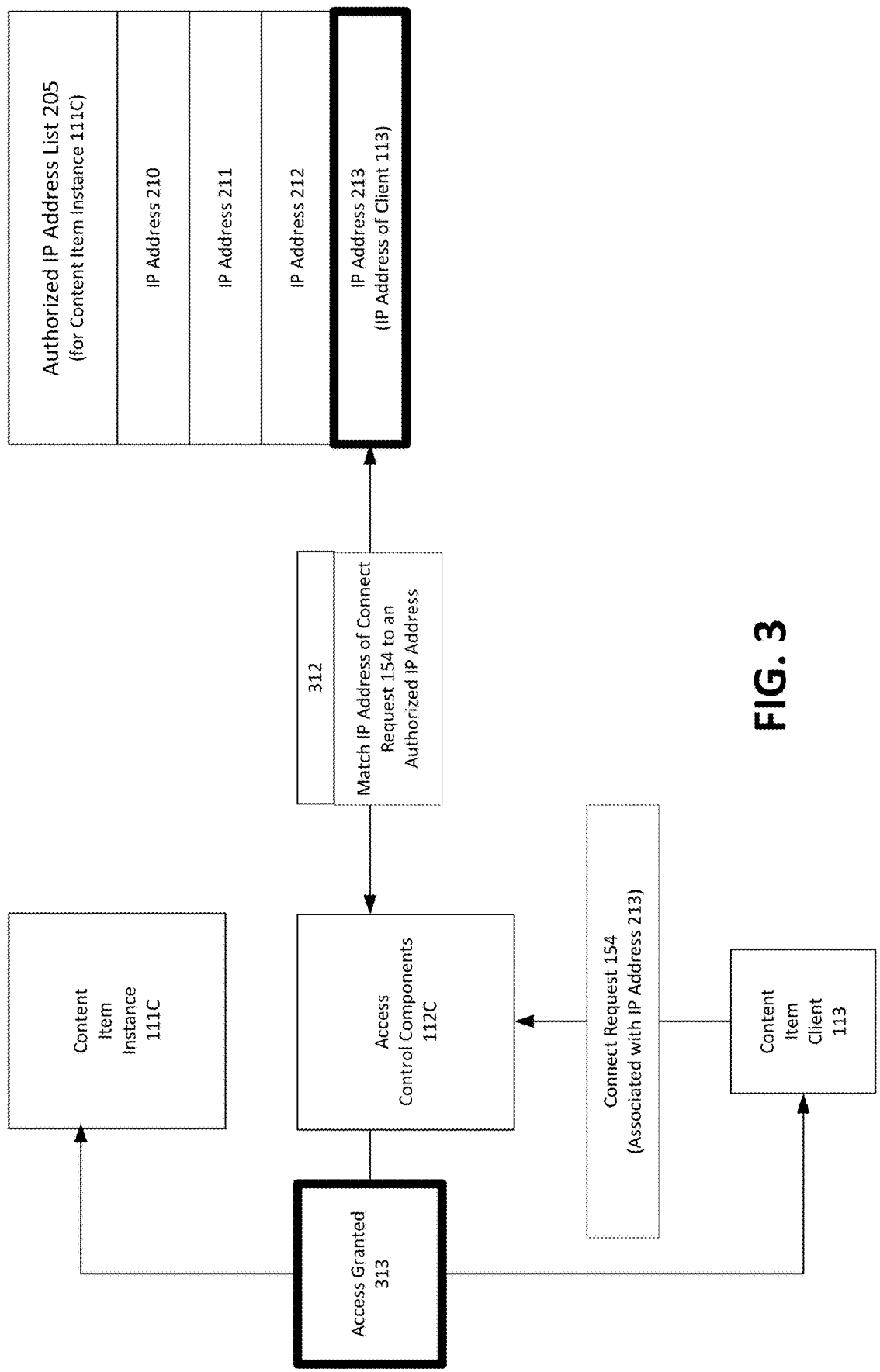
FIG. 3 is a diagram illustrating an example granting of access to a content item instance that may be used in accordance with the present disclosure.

Referring now to FIG. 3, an example granting of access to content item instance 111C will now be described in detail. In the embodiment of FIG. 3, upon examining the connect request 154, the access control components 112C may determine that the connect request is associated with (e.g. sent from and/or through) IP address 213 of client 113. In one embodiment, Access control components 112C may then attempt to match the IP address associated with the connect request (i.e., IP address 213) to an IP address that is included in authorized client IP address list 205 for content instance 111C. As described above with respect to FIG. 2, IP address 213 was added to the authorized client IP address list 205 in accordance with configuration information 152 that identified the IP address 213 as an authorized IP address for content item instance 211. Thus, at operation 312, the access control components 112C will successfully match the IP address 213 associated with the connect request 154 to IP address 213 in authorized client IP address list 205. In one embodiment, based at least in part on this matching of IP addresses, the access control components 112C may determine that client 113 is authorized to access content item instance 111C and, at operation 313, may grant access to content item instance 111C for client 113. Client 113 may then successfully connect to, and interact with, the content item instance 111C.

Figure 4:
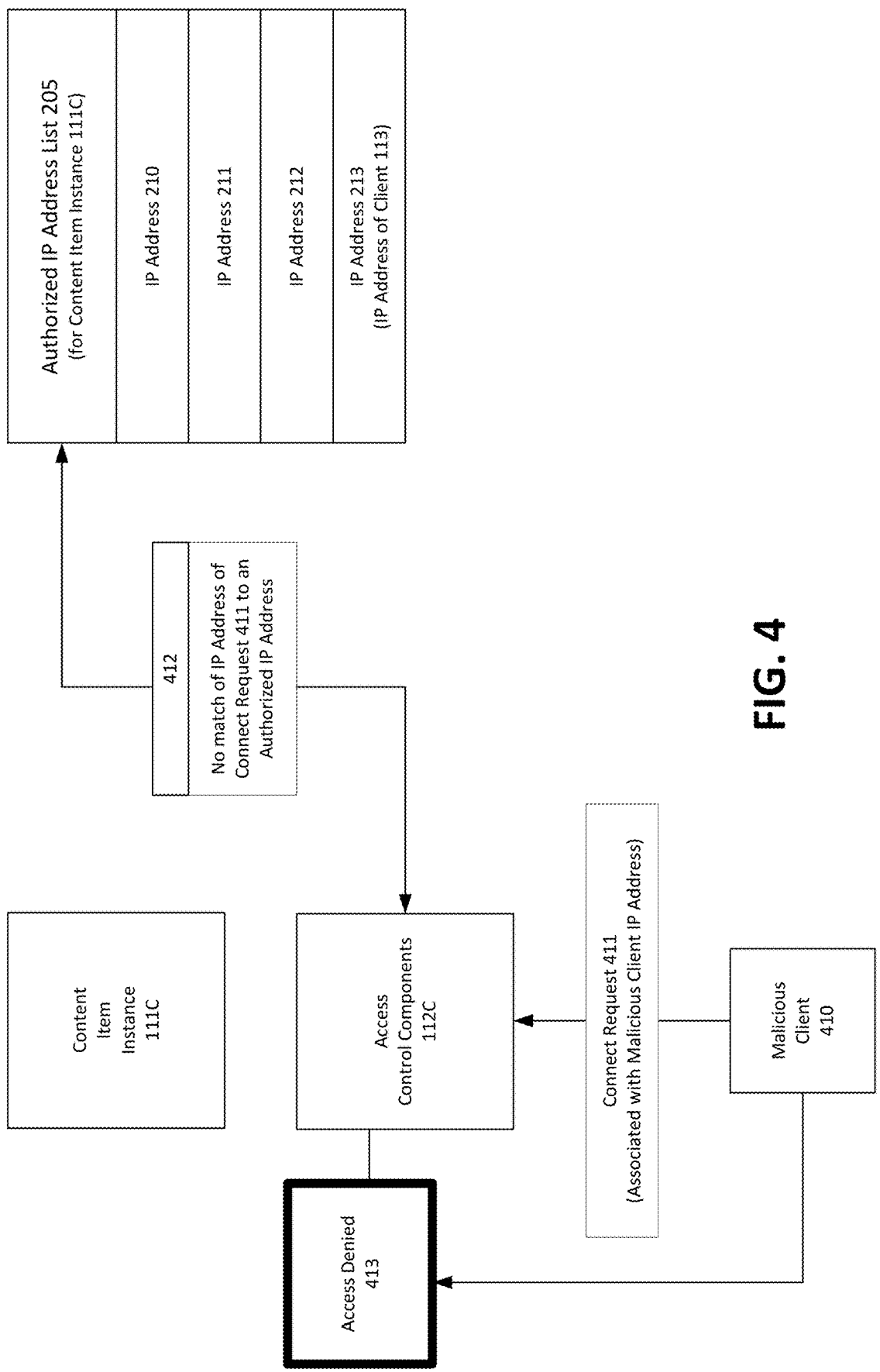
FIG. 4 is a diagram illustrating an example denial of access to a content item instance that may be used in accordance with the present disclosure.

Referring now to FIG. 4, an example denial of access to content item instance 111C will now be described in detail. In the embodiment of FIG. 4, a connect request 411 is issued by a malicious client 410, such as may be operated by a hacker, a DoS or DDoS attacker, and/or another malicious user. In one embodiment, unlike authorized client 113, the malicious client 410 may not issue a join request prior to issuing connect request 411 and attempting to connect to the content item instance 111C. Thus, malicious client 410 will not be assigned or associated with the content item instance 111C, and the IP address of the malicious client 410 will not be included in the authorized client IP address list 205.

In the embodiment of FIG. 4, the connect request 411 may be addressed to content item instance 111 and intercepted or otherwise received by access control components 112C. The access control components 112C may examine the connect request 411 to identify a particular client IP address associated with the connect request 411. In one embodiment, the associated client IP address may be an IP address from and/or through which the connect request 411 is sent, such as a public IP address associated with the malicious client 410. In one embodiment, access control components 112C may then attempt to match the IP address associated with the connect request 411 to an IP address that is included in authorized client IP address list 205 for content instance 111C. However, as described above, because the malicious client 410 is not an authorized user of content item instance 111C, the IP address associated with the connect request 411 will not be included in the authorized client IP address list 205. Thus, at operation 412, the access control components 112C will fail to match the IP address associated with the connect request 411 to any IP address 210-213 in authorized client IP address list 205. In one embodiment, based at least in part on this IP address matching failure, the access control components 112C may determine that malicious client 410 is not authorized to access content item instance 111C and, at operation 413, may deny access to content item instance 111C for malicious client 410, thereby protecting against malicious acts such as hacking, DoS and DDos attacks, and other malicious acts.

In one embodiment, each content item instance 111A-C associated with a particular content item may have a single common port number through which external clients may connect to and interact with the content item instance 111A-C. It is noted however, that use of a single common port number for all content item instances 111A-C may sometimes create additional vulnerability of content item instances 111A-C to hackers and other malicious users. In particular, in some examples, a hacker may determine a port number for a content item instance through trial and error, such as by issuing a number of connection requests with different port numbers until a correct port number is eventually determined. If all of content item instances 111A-C use the same assigned port number, then a hacker may successfully identify the port number for all content item instances merely by successfully obtaining the port number for a single one of content item instances 111A-C. For these and other reasons, it may be desirable to assign different port numbers to two or more (and potentially all) of content item instances 111A-C. In one embodiment, this may be achieved by assigning port numbers to each of content item instances 111A-C at random, such as using a random number generator. In one embodiment, these random or otherwise different port numbers may be assigned to each content item instance 111A-C upon being launched, and the port numbers may be communicated to clients, such as by content management service 114, when the clients are assigned to a particular content item instance 111A-C.

As described above, in one embodiment, access to a content item instance may be limited to authorized clients that are assigned or otherwise associated with the content item instance. It is noted, however, that certain malfunctions or other error conditions may sometimes occur that may potentially lead to authorized clients being denied access to a content item instance. For example, in some cases, there may be error conditions associated with communication paths between content management service 114 and access control components 112A-C and/or content item instances 111A-C. This may result in a failure to provide an authorized IP address to access control components 112A-C. As another example, there may be error conditions associated with access control components 112A-C and/or content item instances 111A-C, such as error conditions that may not allow for proper configuration of authorized client IP address list 205 and/or other access control features. In one embodiment, when an error condition associated with granting access to one or more of content item instances 1111A-C is detected, a determination may be made to at least temporarily allow additional IP addresses to access the one or more of content item instances 1111A-C. For example, in one embodiment, when a client access-related error condition is detected, the content item hosting service 110 may temporarily allow communications from all IP addresses (e.g., including IP addresses not specifically identified on authorized client IP address list 205) to access one or more of content item instances 111A-C, for example until it can be determined that the error condition has been corrected or resolved and/or for a particular selected time period. In an alternative embodiment, when a client access-related error condition is detected, the content item hosting service may temporarily allow communications from all IP addresses other than certain indicated exceptions, such as certain known or suspected malicious IP addresses or otherwise suspicious IP addresses. In one embodiment, if content hosting service 110 does not typically interact with clients or users in a particular geographic region, then IP addresses from that particular region may continue to be blocked, even when communications from other IP addresses are temporarily allowed. Additionally, in one embodiment, if a known hacker has previously used a particular IP address to communicate with the content hosting service 110 or another entity, then communications from that particular IP address may continue to be blocked, even when communications from other IP addresses are temporarily allowed.

In one embodiment, content hosting service 110 may continually monitor access control components 112A-C, content item instances 111A-C and/or other components or functionality to help ensure that client access to content item instances 111A-C is being properly enforced and that no malfunctions or other error conditions are occurring. In particular, in one embodiment, access control components 112A-C and/or content item instances 111A-C may be configured to send, for example to content management service 114, a periodic confirmation signal, such as a heartbeat signal, to confirm that various access control features are being implemented properly. In one embodiment, the confirmation signal may additionally or alternatively be used to confirm that various communication channels, such as between access control components 112A-C, content item instances 111A-C, and/or content management service 114, are operable and allowing necessary communications. In one embodiment, if the content management service 114 fails to receive a confirmation signal from access control components 112A-C and/or content item instances 111A-C within a particular time period, then the content management service 114 may issue instructions to expand content item access to additional IP addresses such as described above. In one embodiment, in addition or as an alternative to a periodic confirmation signal, other confirmation techniques may also be employed, such as issuing periodic diagnostic tests, querying various access control components to pull and confirm information, and other confirmation techniques.

Figure 5:
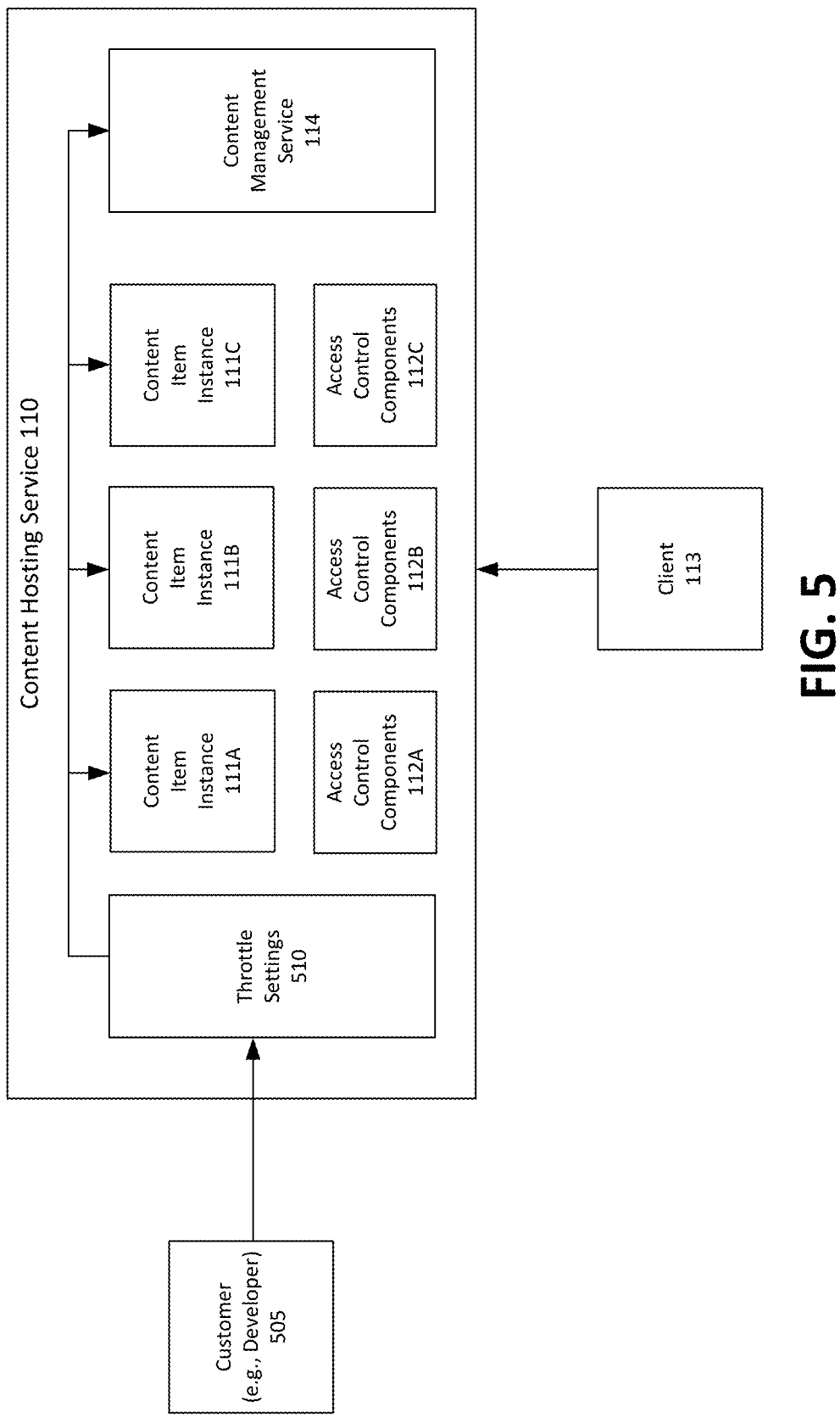
FIG. 5 is a diagram illustrating an example content item access throttling system that may be used in accordance with the present disclosure.

In one embodiment, in addition or as an alternative to the access control techniques set forth above, various client throttling settings may be employed to control access to one or more of content item instances 111A-C. In particular, referring now to FIG. 5, an example content item access throttling system will now be described in detail. As shown in FIG. 5, a customer 505, such as a video game developer, or other entity may set and/or modify throttle settings 510, which may set various thresholds or other limits related to client access of content item instances 111A-C. In one embodiment, throttle settings 510 may include a limit as to how many times a particular client may issue requests to join a particular content item, such as by creating a new instance of a particular content item and/or by creating a new client session on an instance of a particular content item. In particular, in one embodiment, a particular client may issue a request to launch a new content item instance for the client to join. In some examples, a malicious client could potentially issue large quantities of these requests in close time proximity to one another, thereby resulting in creation of a large quantity of new content item instances and resulting in unnecessary consumption of large amounts of resources. In one embodiment, throttle settings 510 may indicate that one or more clients may be limited to a particular threshold quantity of allowed requests to create a content item instance. In one embodiment, content management service 114 may track quantities of requests to create a content item instance issued by particular clients. Additionally, in one embodiment, when a particular client issues a request to create a content item instance, content management service 114 may, before granting the request, determine the quantity of such requests that have already been issued by that particular client. In one embodiment, if allowing the client request does not result in meeting or exceeding the threshold for such requests specified in throttle settings 510, then the client's request may be approved and permitted. By contrast, in one embodiment, if allowing the request results in meeting or exceeding the threshold quantity of allowances for such requests specified in throttle settings 510, then the client's request may be denied. In an alternative embodiment, instead of denying a client request that would meet or exceed a limit, the request may be at least temporarily permitted, but may also be logged, reported to a customer, reported to the created content item instance, or otherwise indicated for further examination or analysis.

In one embodiment, in addition or as an alternative to tracking and throttling a quantity of new content item instance creation requests, other types of client requests may also be tracked and throttled. In particular, in one embodiment, a client may issue requests to a create new client session on one or more of content item instances, and these client session creation requests may also be tracked and limited to a particular quantity. In some examples, a particular client that has an existing connection to a content item instance may request a new connection to a different content item instance. In some cases, such a request may be issued for legitimate (i.e., non-malicious) purposes, such as when a user is not enjoying an existing content item session and would like to join a different content item session that may be more interesting or enjoyable to the user. In other cases, however, such multiple client session creation requests may be issued for malicious purposes, such as part of a DDoS attack or to otherwise consume resources. In one embodiment, when multiple session creation requests are issued by a particular client, notifications of these requests may be sent to the existing content item instances to which the client has an existing connection as well as to the new content item instances that the client has requested to join. The notified entities may then make a determination, for example as to whether to terminate all client sessions, to terminate the prior existing client sessions, and/or to terminate the newly requested client session.

In one embodiment, the throttling limits indicated within throttle settings 510 may be set and applied to various different content item instance relationships. In particular, in one embodiment, a particular throttling limit may be applied across all instances of a particular content item, such as all instances of a particular video game. Additionally, in one embodiment, a particular throttling limit may be applied across other types of instance relationships, such as all instances of a particular game level, all instances of a particular game version, all instances owned by a particular developer or other customer, all instances executing at a particular data center or other locations, and many other types of relationships. Furthermore, in one embodiment, various timing or other attributes may also be applied to the throttling limits indicated in throttling settings 510. In one embodiment, a particular client may be permitted to issue no more than a specified quantity of requests within a particular time proximity to one another, such as within the same hour, day, week, etc.

Figure 6:
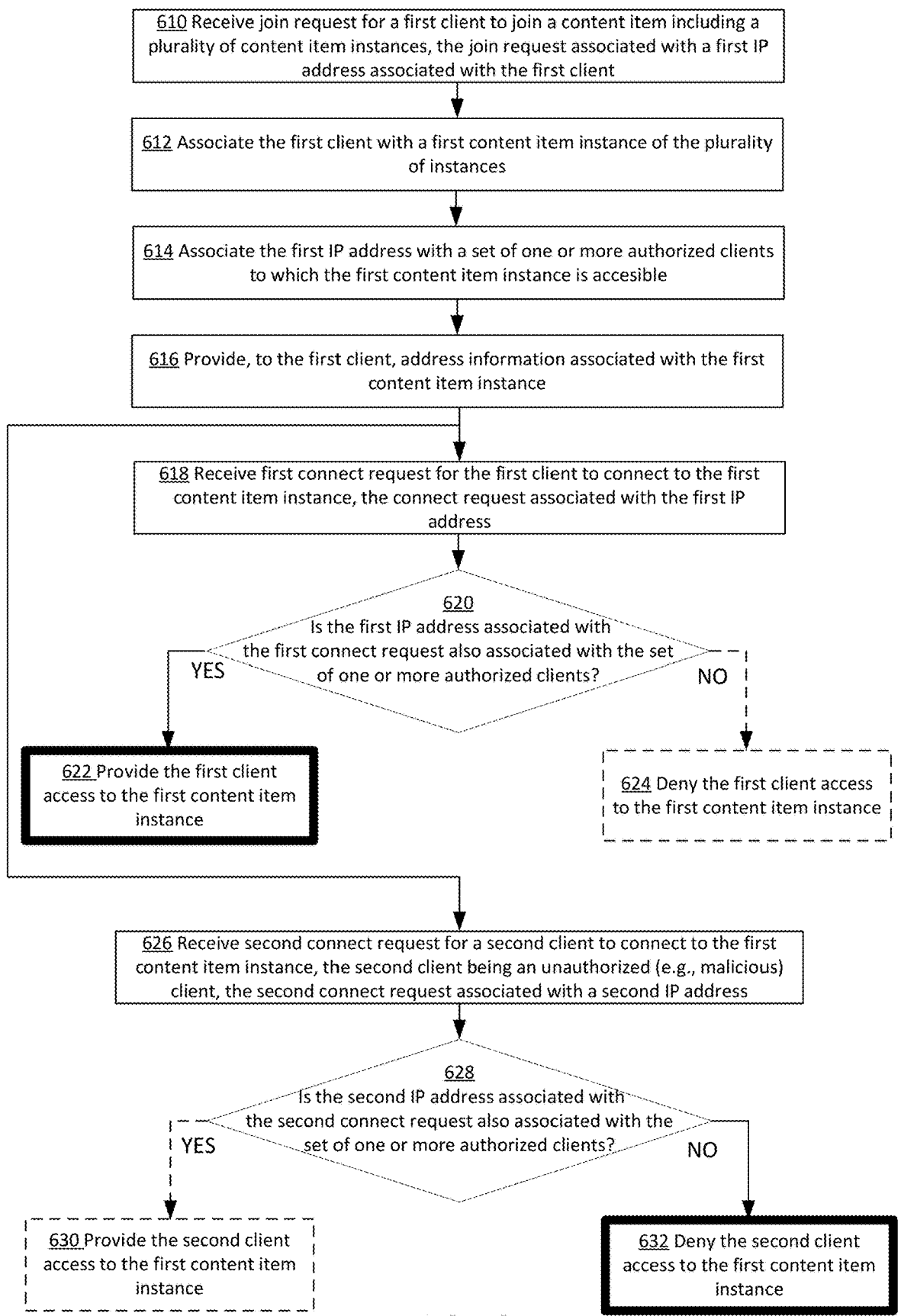
FIG. 6 is a diagram illustrating an example content item instance access control process that may be used in accordance with the present disclosure.

FIG. 6 is a diagram illustrating an example content item instance access control process that may be used in accordance with the present disclosure. At operation 610, a join request is received for a first client to join an interactive content item including a plurality of content item instances. In one embodiment, the interactive content item may be a video game, and the first client may be operated by a video game player. Additionally, in one embodiment, the plurality of content item instances may be hosted by a content hosting service, for example on behalf of a customer, such as a video game developer. Furthermore, in one embodiment, prior to and/or in combination with the join request, the first client may be required to provide identity verification information to the content hosting service, such as a username and password, or other information to indicate that the first client is operated by a user that is authorized to interact with the content hosting service, has an account with the content hosting service, and/or is not a malicious or suspicious user. As set forth above, the join request may be associated with a first Internet Protocol (IP) address that is associated with the first client. In one embodiment, the first IP address may be an IP address from and/or through which the join request is sent to the content hosting service, such as a public IP address associated with the first client. In one embodiment, the first address may be an address of or associated with a computer and/or communications device owned and/or operated by the client 113. Additionally, in one embodiment, the first IP address may be included in a header of the join request, and the content item hosting service may determine the first IP address by examining the header of the join request.

At operation 612, the first client is assigned to, or otherwise associated with, a first content item instance of the plurality of content item instances. In one embodiment, the first client may be assigned to the first content item instance based, at least in part, on an available capacity of one or more content item instances to accept new clients. Additionally, in one embodiment, content item instances may communicate with a content management service and may provide information that may be used to determine their respective available capacity to accept new clients. In one embodiment, this information may include information relating to current quantities of assigned clients, clients that have recently joined or quit, current processor, memory or other resource usage information, and other information.

At operation 614, the first IP address is associated with a set of one or more authorized clients to which the first content item instance is accessible. In particular, in one embodiment, the first content item instance may be accessible to a set of one or more authorized clients and inaccessible to one or more unauthorized clients. Additionally, in one embodiment, the content hosting service may determine that the first IP address is associated with the join request, for example by identifying the first IP address in a header of the join request. Upon making this determination, the content hosting service may provide instructions to associate the first IP address with the set of one or more authorized clients for the first instance. In one embodiment, access control components associated with the first content item instance may maintain a list of IP addresses of authorized clients for the first instance, and the content hosting service may provide instructions to the access control components to add the first IP address to that list.

At operation 616, address information associated with the first content item instance is provided to the first client. In one embodiment, the provided address information may include information for connecting to the first content item instance, such as an IP address and a port number for the first content item instance.

At operation 618, a first connect request is received for the first client to connect to the first content item instance. The first request connect may be addressed to the first instance using the address information provided at operation 616. Similar to the join request, the first connect request may also be associated with the first Internet Protocol (IP) address. In one embodiment, the first IP address may be an IP address from and/or through which the first connect request is sent to the content hosting service, such as a public IP address associated with the first client. For example, in some cases, the first client may send the first connect request from the same computer and/or IP address as was used to send the join request. In one embodiment, the first IP address may be included in a header of the first connect request.

At operation 620, it is determined whether the first IP address associated with the first connect request is also associated with the set of one or more authorized clients for the first content item instance. In one embodiment, the access control components associated with the first content item may determine that the first IP address is associated with the first connect request, for example by identifying the first IP address in a header of the first connect request. Upon making this determination, the access control components may then attempt to match the first IP address associated with the first connect request to one of the IP addresses in an authorized client IP address list for the first content item instance, such as authorized client IP address list 205.

In the example of FIG. 6, the first IP address was associated with the set of one or more authorized clients for the first content item instance at operation 614. Accordingly, at operation 620, it will be determined that the first IP address associated with the first connect request is also associated with the set of one or more authorized clients with the set of one or more authorized clients for the first content item instance. For example, as shown in FIG. 3, the IP address associated with connect request 154 may be matched to IP address 213 in authorized client IP address list 205. Thus, the process will proceed to operation 622, at which the first client is provided access to the first content item instance. FIG. 6 also includes operation 624, which indicates that the first client may be denied access to the first content item instance when the first IP address associated with the first connect request is not also associated with the set of one or more authorized clients. However, as explained above, in the example of FIG. 6, because the first IP address was associated with the set of one or more authorized clients for the first content item instance at operation 614, the process of FIG. 6 will procced from operation 620 to operation 622. Thus, in one embodiment, operation 624 may be performed only in the case of an error condition or other setting (e.g., expiration of an authorization time limit) that may cause the authorization of the first client to fail or expire. This is indicated in FIG. 6 by depicting operation 622 with a bold outline and depicting operation 624 with dashed lines.

At operation 626, a second connect request is received for a second client to connect to the first content item instance. In the example of FIG. 6, the second client is an unauthorized client, such as a hacker, attacker, or other malicious user. The second connect request may also be associated with a second Internet Protocol (IP) address. In one embodiment, the second IP address may be an IP address from and/or through which the second connect request is sent to the content hosting service, such as a public IP address associated with the second client. In one embodiment, the second IP address may be included in a header of the second connect request.

At operation 628, it is determined whether the second IP address associated with the second connect request is also associated with the set of one or more authorized clients for the first content item instance. In one embodiment, the access control components associated with the first content item may determine that the second IP address is associated with the second connect request, for example by identifying the second IP address in a header of the first connect request. Upon making this determination, the access control components may then attempt to match the second IP address associated with the second connect request to one of the IP addresses in an authorized client IP address list for the first content item instance, such as authorized client IP address list 205.

As set forth above, in one embodiment, because the second client is not an authorized client of the first content item instance, the second IP address will not be associated with the set of set of one or more authorized clients for the first content item instance. Accordingly, at operation 628, it will be determined that the second IP address associated with the second connect request is not also associated with the set of one or more authorized clients for the first content item instance. For example, as shown in FIG. 4, the IP address associated with connect request 411 issued by malicious client 410 cannot be matched to any IP addresses in authorized client IP address list 205. Thus, the process will proceed to operation 632, at which the second client is denied access to the first content item instance. FIG. 6 also includes operation 630, which indicates that the second client may be provided access to the first content item instance when the second IP address associated with the second connect request is also associated with the set of one or more authorized clients. However, as explained above, in the example of FIG. 6, because the second client is not an authorized user of the first content item instance, the second IP address will not be associated with the set of one or more authorized clients for the first content item instance, and the process of FIG. 6 will procced from operation 628 to operation 632. Thus, in one embodiment, operation 630 will not be performed and is provided merely to show that malicious users are not granted access to the content item instance. This is indicated in FIG. 6 by depicting operation 632 with a bold outline and depicting operation 630 with dashed lines.

Figure 7:
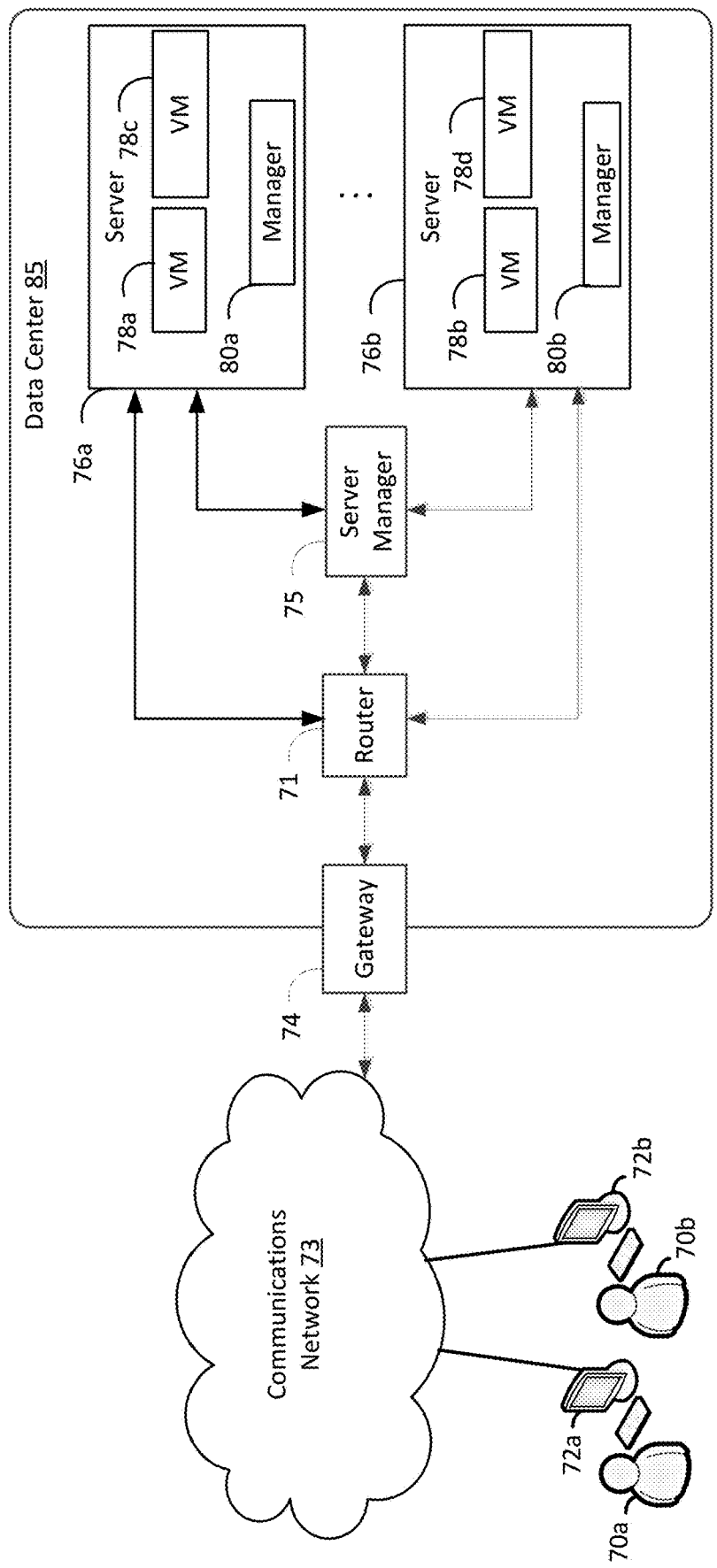
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
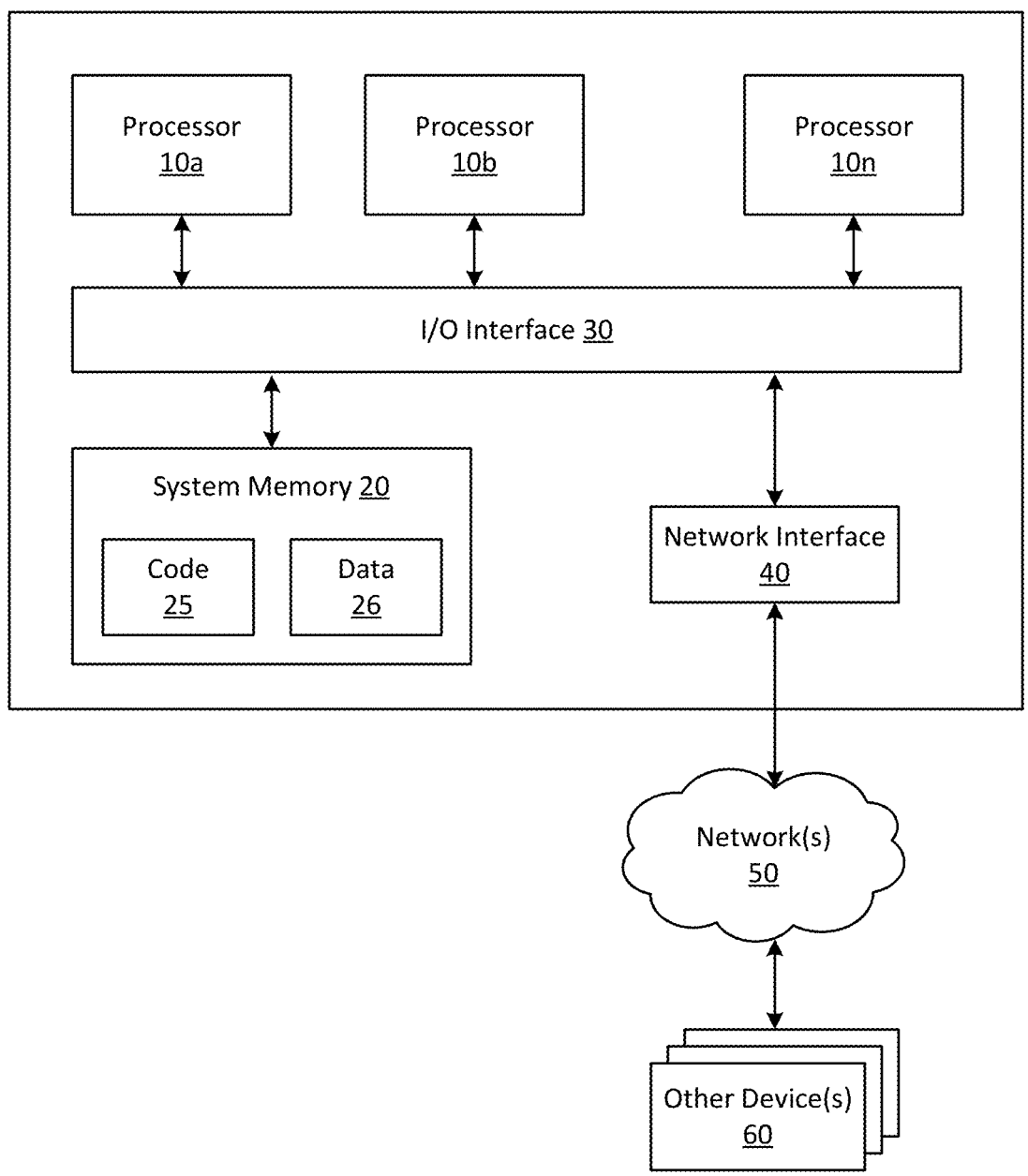
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more processors
one or more memories storing a set of instructions, which upon execution by the one or more processors, causes the one or more processors to perform operations comprising:
receiving, by a service, a first request for a first client to join an interactive video game, the interactive video game including a plurality of video game instances, wherein a plurality of access control components control access to the plurality of video game instances, each of the plurality of video game instances being associated with one or more respective access control components of the plurality of access control components;
determining a first Internet Protocol (IP) address associated with the first request;
associating the first client with a first instance of the plurality of video game instances, wherein the first instance is accessible to a set of one or more authorized clients and inaccessible to one or more unauthorized clients;
providing, by the service that receives the first request, the first IP address to one or more first access control components of the plurality of access control components, the one or more first access control components associated with the first instance;
maintaining, by the one or more first access control components, information regarding the set of one or more authorized clients to which the first instance is accessible;
associating the first IP address with the set of one or more authorized clients;
providing to the first client, address information associated with the first instance;
receiving a second request for the first client to connect to the first instance, the second request being associated with the first IP address;
determining, by the one or more first access control components, whether the first IP address associated with the second request is associated with the set of one or more authorized clients; and if so,
providing the first client access to the first instance.

2. The system of claim 1, wherein the operations further comprise:
receiving a third request for a second client to connect to the first instance, the third request sent from a second IP address that is not associated with the set of one or more authorized clients;
determining that the second IP address is not associated with the set of one or more authorized clients; and
denying the second client access to the first instance.

3. The system of claim 1, wherein a port number of the first instance is assigned at random.

4. The system of claim 1, wherein the operations further comprise:

detecting an error condition associated with granting access to the first instance; and
determining to allow additional IP addresses to access the first instance.

5. A method comprising:
receiving, by a service, a first request for a first client to join an interactive video game, the interactive video game including a plurality of video game instances, wherein a plurality of access control components control access to the plurality of video game instances, each of the plurality of video game instances being associated with one or more respective access control components of the plurality of access control components;
determining a first Internet Protocol (IP) address associated with the first request;
associating the first client with a first instance of the plurality of video game instances, wherein the first instance is accessible to a set of one or more authorized clients and inaccessible to one or more unauthorized clients;
providing, by the service that receives the first request, the first IP address to one or more first access control components of the plurality of access control components, the one or more first access control components associated with the first instance;
maintaining, by the one or more first access control components, information regarding the set of one or more authorized clients to which the first instance is accessible;
associating the first IP address with the set of one or more authorized clients;
providing to the first client, address information associated with the first instance;
receiving a second request for the first client to connect to the first instance;
determining, by the one or more first access control components, whether the first IP address associated with the second request is associated with the set of one or more authorized clients associated with the first instance; and if so,
providing the first client access to the first instance.

6. The method of claim 5, further comprising:
receiving an additional request for a second client to connect to the first instance, the additional request sent from a second IP address that is not associated with the set of one or more authorized clients;
determining that the second IP address is not associated with the set of one or more authorized clients; and
denying the second client access to the first instance.

7. The method of claim 5, wherein the second request for the first client to connect to the first instance is addressed using the address information.

8. The method of claim 5, wherein the address information comprises an IP address of the first instance and a port number of the first instance.

9. The method of claim 5, wherein a port number of the first instance is assigned at random.

10. The method of claim 5, further comprising:
detecting an error condition associated with granting access to the first instance; and
determining to allow additional IP addresses to access the first instance.

11. The method of claim 5, further comprising tracking a quantity of video game instance creation requests issued by the first client.

12. The method of claim 11, further comprising denying a video game instance creation request from the first client that results in meeting or exceeding a threshold quantity of allowed requests.

13. A non-transitory computer-readable storage medium having stored thereon a set of instructions, which upon being performed by one or more computing devices, causes the one or more computing devices to perform operations comprising:
receiving, by a service, a first request for a first client to join an interactive video game, the interactive video game including a plurality of video game instances, wherein a plurality of access control components control access to the plurality of video game instances, each of the plurality of video game instances being associated with one or more respective access control components of the plurality of access control components;
determining a first Internet Protocol (IP) address associated with the first request;
associating the first client with a first instance of the plurality of video game instances, wherein the first instance is accessible to a set of one or more authorized clients and inaccessible to one or more unauthorized clients;
providing, by the service that receives the first request, the first IP address to one or more first access control components of the plurality of access control components, the one or more first access control components associated with the first instance;
maintaining, by the one or more first access control components, information regarding the set of one or more authorized clients to which the first instance is accessible;
associating the first IP address with the set of one or more authorized clients;
providing to the first client, address information associated with the first instance;
receiving a second request for the first client to connect to the first instance;
determining, by the one or more first access control components, whether the first IP address associated with the second request is associated with the set of one or more authorized clients associated with the first instance; and if so,
providing the first client access to the first instance.

14. The non-transitory computer-readable storage medium of claim 13, wherein the operations further comprise:
receiving an additional request for a second client to connect to the first instance, the additional request sent from a second IP address that is not associated with the set of one or more authorized clients;
determining that the second IP address is not associated with the set of one or more authorized clients; and
denying the second client access to the first instance.

15. The non-transitory computer-readable storage medium of claim 13, wherein the second request for the first client to connect to the first instance is addressed using the address information.

16. The non-transitory computer-readable storage medium of claim 13, wherein the address information comprises an IP address of the first instance and a port number of the first instance.

17. The non-transitory computer-readable storage medium of claim 13, wherein a port number of the first instance is assigned at random.

\* \* \* \* \*